United States Patent
Wang

(10) Patent No.: US 10,340,796 B2
(45) Date of Patent: Jul. 2, 2019

(54) CONSTANT ON TIME BOOST CONVERTER CONTROL

(71) Applicant: Cirrus Logic International Semiconductor Ltd., Edinburgh (GB)

(72) Inventor: Xiangcheng Wang, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/149,806

(22) Filed: May 9, 2016

(65) Prior Publication Data

US 2017/0324325 A1    Nov. 9, 2017

(51) Int. Cl.
*H02M 3/158* (2006.01)
*H02M 1/08* (2006.01)
*H02M 3/157* (2006.01)
*H02M 1/00* (2006.01)

(52) U.S. Cl.
CPC ............. *H02M 3/158* (2013.01); *H02M 1/08* (2013.01); *H02M 3/157* (2013.01); *H02M 2001/0009* (2013.01)

(58) Field of Classification Search
CPC .............................................. H02M 2001/0009
See application file for complete search history.

(56) References Cited

U.S. PATENT DOCUMENTS

| | | | | |
|---|---|---|---|---|
| 7,071,660 B2 * | 7/2006 | Xu | ........................ | H02M 3/156 323/266 |
| 7,372,241 B1 * | 5/2008 | Tomiyoshi | .......... | H02M 3/1588 323/224 |
| 7,936,160 B1 * | 5/2011 | Sheehan | ................ | H02M 3/156 323/222 |
| 9,178,415 B1 * | 11/2015 | Kost | ...................... | H02M 3/157 |
| 2004/0095121 A1 | 5/2004 | Kernahan et al. | | |
| 2005/0168198 A1 * | 8/2005 | Maksimovic | ....... | H02M 1/4225 323/222 |
| 2007/0210766 A1 | 9/2007 | Borowy et al. | | |
| 2009/0039852 A1 | 2/2009 | Fishelov et al. | | |
| 2009/0168472 A1 * | 7/2009 | Chung | ................ | H02M 3/1584 363/65 |
| 2014/0002037 A1 * | 1/2014 | Babazadeh | ........... | H02M 3/156 323/271 |

(Continued)

FOREIGN PATENT DOCUMENTS

| | | |
|---|---|---|
| CN | 104935201 A | 9/2015 |
| JP | 2010200517 A | 7/2013 |

OTHER PUBLICATIONS

Lopez-Martin, Victor; Azcondo, Francisco; de Castro, Angel; High-resolution error compensation in continuous conduction mode power factor correction stage without current sensor, IEEE, 15th International Power Electronics and Motion Control Conference, Sep. 6, 2012, pp. LS3c2-1 to Ls3c2-8. (Year: 2012).*

(Continued)

*Primary Examiner* — Harry R Behm
(74) *Attorney, Agent, or Firm* — Jackson Walker L.L.P.

(57) ABSTRACT

In accordance with embodiments of the present disclosure, a controller for controlling at least one switch of a switching converter may include a current estimator configured to determine an estimated inductor current through an inductor of the switching converter based on a previous sample of a current through the inductor and a switch control configured to control activation and deactivation of the at least one switch based on the estimated inductor current.

13 Claims, 3 Drawing Sheets

(56) References Cited

U.S. PATENT DOCUMENTS

2014/0175888 A1* 6/2014 Deboy .................... H02J 3/383
　　　　　　　　　　　　　　　　　　　　　　　307/82
2015/0022172 A1　 1/2015　Hari et al.
2015/0381039 A1　12/2015　Hari et al.

OTHER PUBLICATIONS

Combined Search and Examination Report, United Kingdom Application No. GB1610243.6, dated Dec. 13, 2016.

* cited by examiner

US 10,340,796 B2

CONSTANT ON TIME BOOST CONVERTER CONTROL

FIELD OF DISCLOSURE

The present disclosure generally relates to integrated circuits, and, more particularly, to systems and methods for implementing a constant on time boost power converter of an electronic circuit.

BACKGROUND

Many electronic devices on the market today often use power converters to convert electric energy from one form to another (e.g., converting between alternating current and direct current), converting a voltage or current of an electrical signal, modifying a frequency of an electrical signal, or some combination of the above. Examples of power converters may include boost converters and buck converters. Such power converters are often used to convert an input voltage for other circuitry, wherein such converted voltage is greater than (e.g., if a boost converter is used) or less than (e.g., if a buck converter is used) the input voltage. For example, a boosted audio amplifier may include a boost converter for converting an input source voltage to produce a supply voltage for a switched output stage (e.g., a Class D of buck converter) of the amplifier.

SUMMARY

In accordance with the teachings of the present disclosure, certain disadvantages and problems associated with output signal integrity of a power converter have been reduced or eliminated.

In accordance with embodiments of the present disclosure, a controller for controlling at least one switch of a switching converter may include a current estimator configured to determine an estimated inductor current through an inductor of the switching converter based on a previous sample of a current through the inductor and a switch control configured to control activation and deactivation of the at least one switch based on the estimated inductor current.

In accordance with these and other embodiments of the present disclosure, a method may include determining an estimated inductor current through an inductor of a switching converter based on a previous sample of a current through the inductor and controlling activation and deactivation of the at least one switch based on the estimated inductor current.

In accordance with these and other embodiments of the present disclosure, a circuit may include a switching converter, a switched output stage coupled to the switching converter, wherein the switching converter generates a supply voltage to the switched output stage, and a controller for controlling at least one switch of a switching converter comprising a current estimator configured to determine an estimated inductor current through an inductor of the switching converter based on a previous sample of a current through the inductor and a switch control configured to control activation and deactivation of the at least one switch based on the estimated inductor current.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
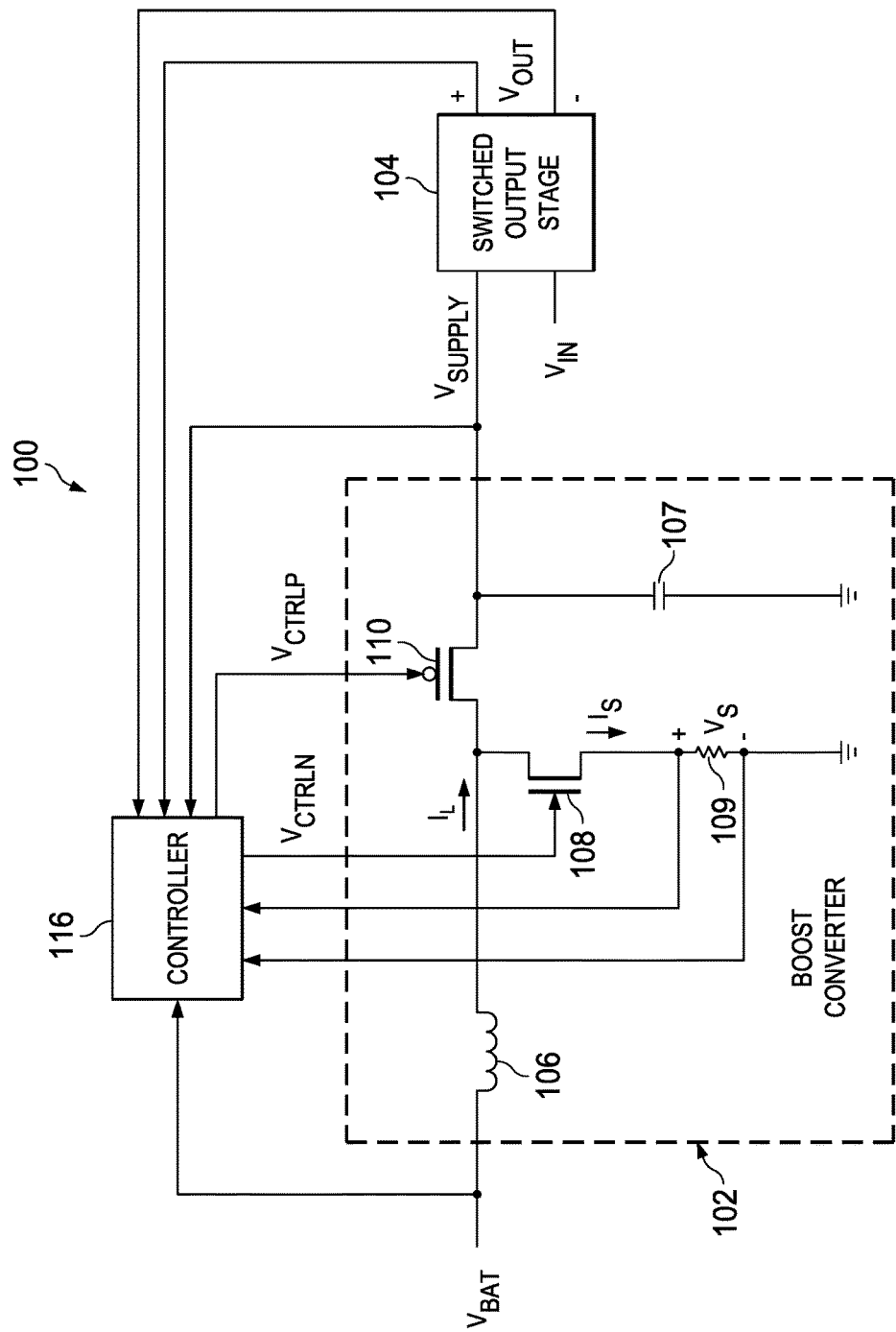
FIG. 1 illustrates an example circuit comprising a boost converter for converting an input source voltage to produce a supply voltage for a switched output stage of an amplifier, in accordance with embodiments of the present disclosure.

FIG. 1 illustrates an example circuit 100 comprising a boost converter 102 for converting an input source voltage $V_{BAT}$ to produce a supply voltage $V_{SUPPLY}$ for a switched output stage 104 of an amplifier (e.g., an audio amplifier), in accordance with embodiments of the present disclosure. As shown in FIG. 1, boost converter 102 may comprise an inductor 106 coupled at a first terminal to an input source voltage $V_{BAT}$ and coupled at a second terminal to non-gate terminals of each of switches 108 and 110. Boost converter 102 shown in FIG. 1 may also comprise a switch 108 (e.g., an n-type metal-oxide-semiconductor field effect transistor) coupled at one non-gate terminal to a ground voltage and coupled at its other non-gate terminal to inductor 106 and a non-gate terminal of switch 110, and a switch 110 (e.g., a p-type metal-oxide-semiconductor field effect transistor) coupled at one non-gate terminal to inductor 106 and a non-gate terminal of switch 108 and coupled at its other non-gate terminal to a terminal of capacitor 107. Boost converter 102 shown in FIG. 1 may also include a capacitor 107 coupled between a non-gate terminal of switch 110 and a ground voltage. Furthermore, boost converter 102 may comprise a sense resistor 109 for sensing a current $I_S$ flowing through switch 108 (e.g., $I_S = V_S/R_S$, where $V_S$ is a voltage across sense resistor 109 and $R_S$ is an electrical resistance of sense resistor 109). Such current $I_S$ may be indicative of a current $I_L$ flowing through inductor 106 when switch 108 is closed.

Switched output stage 104 may include any suitable system, device, or apparatus configured to generate an output voltage $V_{OUT}$ based on an input signal $V_{IN}$ provided to switched output stage 104, using electrical energy provided by supply voltage $V_{SUPPLY}$ provided by boost converter 102. For example, in some embodiments, switched output stage 104 may comprise a Class D output stage. In these and other embodiments, switched output stage 104 may comprise a buck converter. In some embodiments, output voltage $V_{OUT}$ and input signal $V_{IN}$ may comprise audio signals. In other embodiments, output voltage $V_{OUT}$ and input signal $V_{IN}$ may comprise ultrasonic signals.

Controller 116 may include any suitable system, device, or apparatus configured to, based on measured signals within circuit 100 (e.g., current $I_S$, supply voltage $V_{SUPPLY}$, output voltage $V_{OUT}$, input source voltage $V_{BAT}$), drive a positive-polarity control voltage $v_{CTRLP}$ to the gate terminal of switch 110 and to drive a negative-polarity control voltage $v_{CTRLN}$ to the gate terminal of switch 108. Each of positive-polarity control voltage $v_{CTRLP}$ and negative-polarity control voltage $v_{CTRLN}$ may be pulse-width modulated signals. In steady-state operation, switch 108 will generally be open when switch 110 is closed, and vice versa (although, in some embodiments, a diode may be used in lieu of switch 110, wherein an anode of such diode may be coupled to inductor 106 and the cathode of such diode may be coupled to capacitor 107). When switch 108 is closed, current may flow from the voltage source generating the input source voltage $V_{BAT}$ through inductor 106, and inductor 106 may store energy. During this time, inductor 106 may have a voltage drop across it, with a positive-polarity at the terminal coupled to the input source voltage $V_{BAT}$. When switch 108 is open and switch 110 is closed, the current flowing through inductor 106 may be reduced. Such change or reduction in current may be opposed by inductor 106 and the voltage polarity of inductor 106 may reverse (e.g., with a positive-polarity at the terminal coupled to generating the input source voltage $V_{BAT}$). As a result, effectively two voltage sources are in series (input source voltage $V_{BAT}$ and the voltage across inductor 106), thus causing a voltage higher than $V_{BAT}$ to charge capacitor 107. If switches 108 and 110 are cycled fast enough, inductor 106 will not discharge fully in between charging stages, and the supply voltage $V_{SUPPLY}$ on capacitor 107 will have voltage greater than that of the input source voltage $V_{BAT}$ when switch 108 is opened. Thus, supply voltage $V_{SUPPLY}$ generated by boost converter 102 may be a function of positive-polarity control voltage $v_{CTRLP}$, negative-polarity control voltage $v_{CTRLN}$, and the input source voltage $V_{BAT}$.

Figure 2:
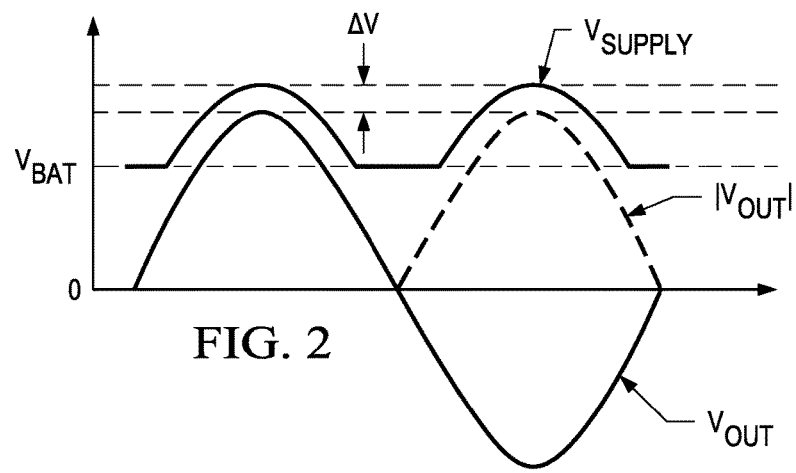
FIG. 2 illustrates a graph showing example waveforms for an output voltage of the switched output stage of FIG. 1 and a supply voltage supplied to the switched output stage by the boost converter of FIG. 1, in accordance with embodiments of the present disclosure.

In some embodiments, controller 116 may track an envelope of output voltage $V_{OUT}$, and for higher magnitudes of output voltage $V_{OUT}$ (e.g., $|V_{OUT}|>V_{BAT}-\Delta V$, wherein $\Delta V$ is a headroom offset voltage), and controller 116 may cause supply voltage $V_{SUPPLY}$ to track the magnitude of output voltage $V_{OUT}$, such that supply voltage $V_{SUPPLY}$ is approximately equal to the magnitude of output voltage $V_{OUT}$ plus the headroom offset voltage $\Delta V$. Such envelope tracking may allow for a wide range of output voltage $V_{OUT}$ while minimizing power consumption. FIG. 2 illustrates a graph showing example waveforms for output voltage $V_{OUT}$ and supply voltage $V_{SUPPLY}$, in accordance with embodiments of the present disclosure.

Figure 3:
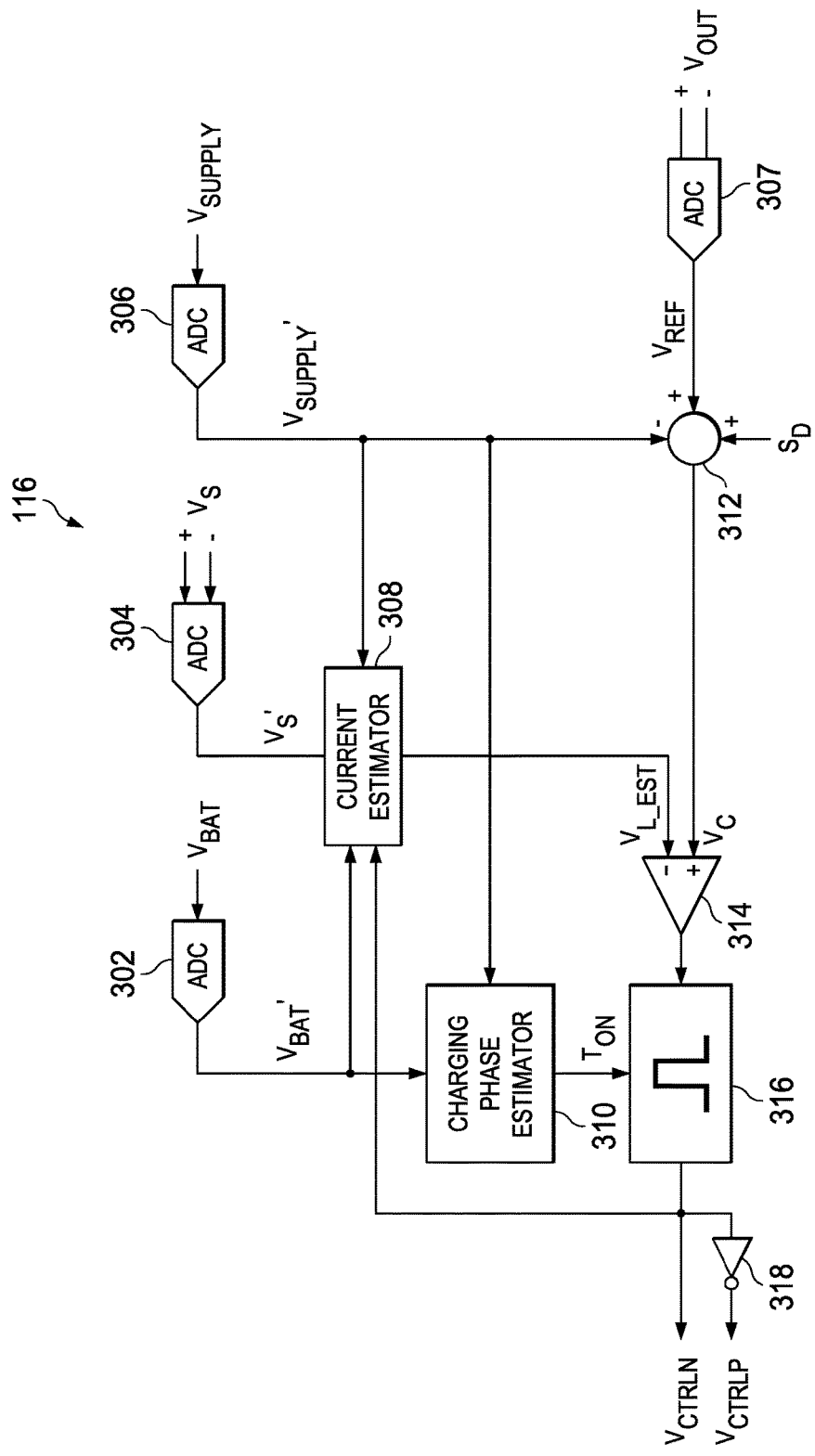
FIG. 3 illustrates an example controller for controlling the boost converter of FIG. 1, in accordance with embodiments of the present disclosure.

FIG. 3 illustrates an example controller 116 for controlling boost converter 102, in accordance with embodiments of the present disclosure. As shown in FIG. 3, analog voltages for input source voltage $V_{BAT}$, sense resistor voltage $V_S$ (indicative of current $I_S$), supply voltage $V_{SUPPLY}$, and output voltage $V_{OUT}$, may be respectively sampled by analog-to-digital converters 302, 304, 306, and 307 and converted into respective corresponding digital signals $V_{BAT}'$, $V_S'$, $V_{SUPPLY}'$, and $V_{REF}$, indicative of such voltages. In the case of output voltage $V_{OUT}$, analog-to-digital converter 307 may convert output voltage $V_{OUT}$ into reference voltage signal $V_{REF}$ based on a magnitude of output voltage $V_{OUT}$. For example, in some embodiments, reference voltage signal $V_{REF}$ may equal the sum of output voltage $V_{OUT}$ and headroom offset voltage $\Delta V$.

A current estimator 308 may comprise any suitable system, device or apparatus configured to, based on digital signals $V_{BAT}'$, $V_S'$, and $V_{SUPPLY}'$, estimate inductor current $I_L$ to generate an estimated voltage signal $V_{L\_EST}$, which represents a voltage induced across sense resistor 109 by inductor current $I_L$. While the digital signal $V_S'$ may itself alone be a voltage indicative of instantaneous inductor current $I_L$ (which flows through sense resistor 109) during the duration of time during each switching cycle of boost converter 102 in which switch 108 is closed (e.g., $I_L=I_S=V_S/R_S$ when switch 108 is closed), such is not the case when switch 108 is open as sense voltage $V_S$ may be equal to zero when switch 108 is open, but inductor 106 may continue conducting current. Accordingly, when switch 108 is open, current estimator 308 may apply volt-second balance calculations, as described in greater detail below, to generate estimated current $I_{L\_EST}$ during durations in which switch 108 is open.

A charging phase estimator 310 may comprise any suitable system, device or apparatus configured to, based on digital signals $V_{BAT}'$ and $V_{SUPPLY}'$, estimate a duration of time $T_{ON}$ during a switching cycle of boost converter 102 in which controller 116 should cause switch 108 to close (e.g., a charging phase in which switch 108 is closed and switch 110 is open such that inductor 106 charges). For example, duration $T_{ON}$ may be longer when supply voltage $V_{SUPPLY}$ is much greater than input source voltage $V_{BAT}$, and shorter when supply voltage $V_{SUPPLY}$ is closer in magnitude to input source voltage $V_{BAT}$.

A combiner 312 may subtract digital signal $V_{SUPPLY}'$ from the sum of reference voltage signal $V_{REF}$ and a slope compensation signal $S_d$, in order to generate a compensation signal $V_c$. Slope compensation signal $S_d$ may compensate slope to provide for whole system stability of controller 116. Details and methods for such slope compensation are outside the scope of this disclosure.

A comparator 314 may compare compensation signal $V_c$ and estimated voltage $V_{L\_EST}$ such that comparator 314 asserts its output (e.g., outputs a logic 1) when compensation signal $V_c$ is larger than the product of estimated voltage $V_{L\_EST}$ and deasserts its output (e.g., outputs a logic 0) otherwise. Assertion of the output of comparator 314 may trigger a pulse-width modulation generator 316 to output a pulse with a duration of time $T_{ON}$ such that pulse-width modulation generator 316 drives pulse-width modulated control voltage $v_{CTRLN}$ based on triggering from comparator 314 and a pulse width estimated by charging phase estimator 310. Controller 116 may also include a logic inverter 318 to a control voltage $v_{CTRLP}$ as a complement to control voltage $v_{CTRLN}$ with certain non-overlapped time.

Figure 4:
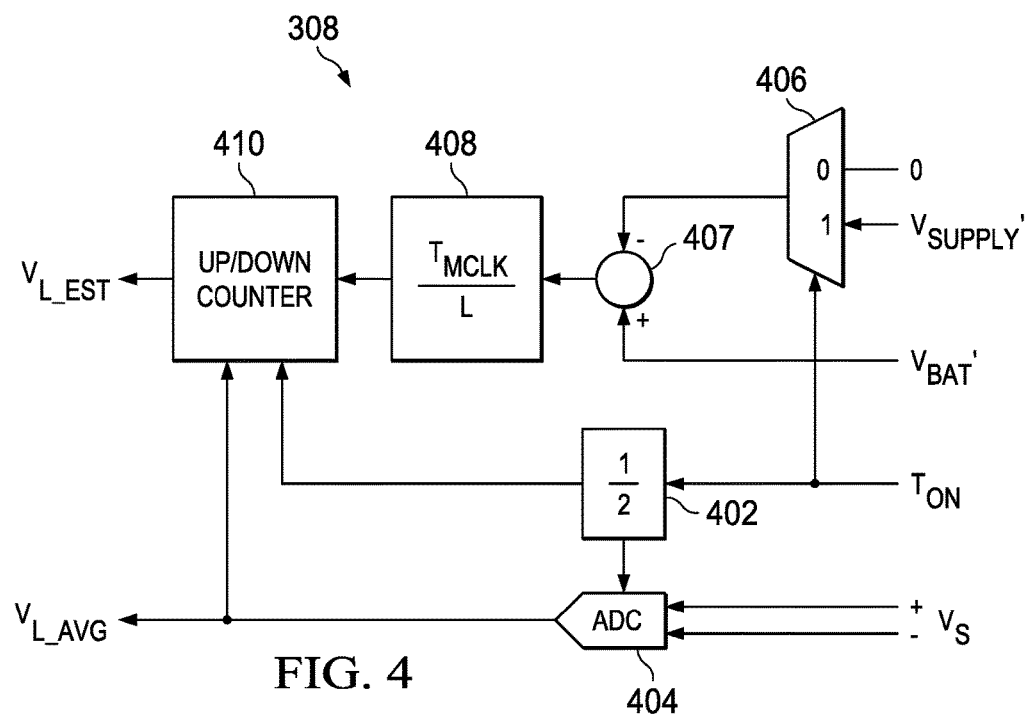
FIG. 4 illustrates an example inductor current estimator of the controller depicted in FIG. 3, in accordance with embodiments of the present disclosure.

FIG. 4 illustrates an example inductor current estimator 308 of controller 116, in accordance with embodiments of the present disclosure. As shown in FIG. 4, inductor current estimator 308 may include a trigger 402 that may receive estimated charging phase time $T_{ON}$ as its input and generate a trigger signal at a midpoint of such estimated charging phase time $T_{ON}$. An analog-to-digital converter 404 may sample sense resistor voltage $V_S$ responsive to such trigger, such that it outputs a digital signal $V_{L\_AVG}$ indicative of an average input current of inductor current $I_L$.

A multiplexer 406 may pass zero during duration of time $T_{ON}$, and output digital signal $V_{SUPPLY}'$ otherwise. Such output of multiplexer 406 may be subtracted from digital signal $V_{BAT}'$ by combiner 407 resulting in a signal indicative of a voltage across inductor 106 (e.g., such voltage equal to digital signal $V_{BAT}'$ during estimated charging phase time $T_{ON}$, otherwise such voltage equal to digital signal $V_{BAT}'$ minus digital signal $V_{SUPPLY}'$. A preset gain block 408 may receive the signal output by combiner 407 and based thereon, apply a gain equal to a clock period of boost converter 102 divided by an inductance L of inductor 106 in order to generate a signal indicating an estimated slope (e.g., change in current versus time) for the increasing inductor current $I_L$ during duration of time $T_{ON}$, and outside of estimated charging phase time $T_{ON}$, generate a signal indicating an estimated slope for the decreasing inductor current $I_L$. An up/down counter 410 may receive digital signal $V_{L\_AVG}$, the trigger signal generated by trigger 402, and the current slope signal output by preset gain block 408, and based thereon, generate estimated voltage signal $V_{L\_EST}$ indicative of an estimate of current $I_L$ flowing through inductor 106. In operation, up/down counter 410 may increase estimated voltage $V_{L\_EST}$ at the rate indicated by the slope output by preset gain block 408 (e.g., $(V_{BAT}'*T_{MCLK}/L)$ until the trigger 402 executes at the midpoint of estimated charging phase time $T_{ON}$, at which the output of up/down counter 410 output is set to digital signal $V_{L\_AVG}$ indicative of the average current through inductor 106, after which and it continues to increase estimated voltage $V_{IL\_EST}$ at the rate indicated by the slope output by preset gain block 408 (e.g., $(V_{BAT}'*T_{MCLK}/L)$ for the remainder of estimated charging phase time $T_{ON}$. Outside of estimated charging phase time $T_{ON}$, up/down counter 410 may decrease estimated voltage $V_{IL\_EST}$ at the rate indicated by the slope output by preset gain block 408 (e.g., $((V_{BAT}'-V_{SUPPLY}')*T_{MCLK}/L)$. Any drift from ideal voltage-second balance may be addressed by resetting estimated voltage $V_{L\_EST}$ to digital signal $V_{L\_AVG}$ output at the midpoint of estimated charging phase time $T_{ON}$, which may result in an accurate estimation of inductor current for loop controller 116.

As used herein, when two or more elements are referred to as "coupled" to one another, such term indicates that such two or more elements are in electronic communication whether connected indirectly or directly, without or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosures have been described in detail, it should be understood that various changes, substitutions, and alterations could be made hereto without departing from the spirit and scope of the disclosure.

What is claimed is:

1. A controller for controlling at least one switch of a boost switching converter comprising an inductor coupled to a first terminal of a power supply, a first switch coupled between the inductor and an output of the boost switching converter, and a second switch coupled between the inductor and a second terminal of the power supply, the controller comprising:
    a current estimator configured to determine an estimated inductor current through the inductor during a first phase of a particular switching cycle of the boost switching converter in which the inductor is discharging, the first switch is activated, and the second switch is deactivated, wherein the current estimator is configured to estimate the inductor current by applying volt-second balance calculations to determine the estimated inductor current based on: (a) a previous sample of a current through the inductor during a second phase of the particular switching cycle of the boost switching converter in which the inductor is charging, the second switch is activated, and the first switch is deactivated, (b) a power supply voltage between the first terminal of the power supply and the second terminal of the power supply, and (c) an output voltage at the output of the boost switching converter; and
    a switch control configured to control activation and deactivation of the at least one switch based on the estimated inductor current.

2. The controller of claim 1, further comprising a reference voltage input for receiving a reference voltage, and wherein the switch control is further configured to control activation and deactivation of the at least one switch based on the reference voltage.

3. The controller of claim 2, wherein the reference voltage is an audio signal.

4. The controller of claim 2, wherein the reference voltage is an ultrasonic signal.

5. A method for controlling at least one switch of a boost switching converter comprising an inductor coupled to a first terminal of a power supply, a first switch coupled between the inductor and an output of the boost switching converter, and a second switch coupled between the inductor and a second terminal of the power supply, the method comprising:
    a current estimator determining an estimated inductor current through the inductor during a first phase of a particular switching cycle of the boost switching converter in which the inductor is discharging, the first switch is activated, and the second switch is deactivated, wherein the inductor current is estimated by applying volt-second balance calculations to determine the estimated inductor current based on: (a) a previous sample of a current through the inductor during a second phase of the particular switching cycle of the boost switching converter in which the inductor is charging, the second switch is activated, and the first switch is deactivated, (b) a power supply voltage between the first terminal of the power supply and the second terminal of the power supply, and (c) an output voltage at the output of the boost switching converter; and
    controlling activation and deactivation of at least one switch based on the estimated inductor current.

6. The method of claim 5, further comprising a reference voltage input for receiving a reference voltage, and wherein a switch control is further configured to control activation and deactivation of the at least one switch based on the reference voltage.

7. The method of claim 6, wherein the reference voltage is an audio signal.

8. The method of claim 6, wherein the reference voltage is an ultrasonic signal.

9. A circuit comprising:
a boost switching converter comprising:
an inductor coupled to a first terminal of a power supply;
a first switch coupled between the inductor and an output of the boost switching converter;
and a second switch coupled between the inductor and a second terminal of the power supply;
a switched output stage coupled to the boost switching converter, wherein the boost switching converter is configured to generate a supply voltage to the switched output stage; and
a controller for controlling at least one switch of the boost switching converter, the controller comprising:
a current estimator configured to determine an estimated inductor current through the inductor during a first phase of a particular switching cycle of the boost switching converter in which the inductor is discharging, the first switch is activated, and the second switch is deactivated, wherein the current estimator is configured to estimate the inductor current by applying volt-second balance calculations to determine the estimated inductor current based on: (a) a previous sample of a current through the inductor during a second phase of the particular switching cycle of the boost switching converter in which the inductor is charging, the second switch is activated, and the first switch is deactivated, (b) a power supply voltage between the first terminal of the power supply and the second terminal of the power supply, and (c) an output voltage at the output of the boost switching converter; and
a switch control configured to control activation and deactivation of the at least one switch based on the estimated inductor current.

10. The circuit of claim 9, further comprising a reference voltage input for receiving a reference voltage, and wherein the switch control is further configured to control activation and deactivation of the at least one switch based on the reference voltage.

11. The circuit of claim 10, wherein the reference voltage is an audio signal.

12. The circuit of claim 10, wherein the reference voltage is an ultrasonic signal.

13. The circuit of claim 10, wherein the reference voltage is based on an output voltage generated by the switched output stage.

* * * * *